(12) United States Patent
Park et al.

(10) Patent No.: US 10,543,444 B2
(45) Date of Patent: Jan. 28, 2020

(54) BAG FILTERS HAVING CONTROLLED AIR PERMEABILITY AND DUST COLLECTORS USING THE SAME

(71) Applicant: KOREA INSTITUTE OF ENERGY RESEARCH, Daejeon (KR)

(72) Inventors: Hyun-Seol Park, Daejeon (KR); Joon-Mok Shim, Sejong-si (KR); Yun-Haeng Joe, Daejeon (KR); Jeong-Gu Yeo, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 32 days.

(21) Appl. No.: 15/418,159

(22) Filed: Jan. 27, 2017

(65) Prior Publication Data

US 2017/0216752 A1    Aug. 3, 2017

(30) Foreign Application Priority Data

Jan. 29, 2016  (KR) .................... 10-2016-0011361

(51) Int. Cl.
*B01D 46/00*   (2006.01)
*B01D 46/02*   (2006.01)
*B01D 46/04*   (2006.01)

(52) U.S. Cl.
CPC .......... *B01D 46/023* (2013.01); *B01D 46/04* (2013.01); *B01D 2275/10* (2013.01); *B01D 2275/302* (2013.01); *B01D 2275/307* (2013.01)

(58) Field of Classification Search
CPC .............. B01D 46/00; B01D 46/02–08; B01D 46/0057–0076; B01D 46/52–528; B01D 46/54–546; B01D 2275/10; B01D 2275/302; B01D 2275/307

USPC ........... 55/282–305, 315–337, 341.1–341.7, 55/490–519, 522–528

See application file for complete search history.

(56) References Cited

U.S. PATENT DOCUMENTS

| | | | | |
|---|---|---|---|---|
| 5,755,962 A | * | 5/1998 | Gershenson | ........... B01D 25/24 210/452 |
| 2012/0174787 A1 | * | 7/2012 | Bansal | .................... B01D 46/02 95/284 |
| 2015/0151236 A1 | * | 6/2015 | Bansal | ................. B01D 46/543 55/491 |

FOREIGN PATENT DOCUMENTS

KR       10-1475866 B1    12/2014

* cited by examiner

Primary Examiner — T. Bennett McKenzie
(74) Attorney, Agent, or Firm — BakerHostetler

(57) ABSTRACT

The present invention provides a dust collector which includes a chamber divided into an inlet chamber and a discharge chamber by a barrier, and a bag filter which is installed inside of the inlet chamber, and is formed in a shape having an inner space and an opening part by a filter medium, so as to communicate with the discharge chamber through the opening part, wherein a treatment gas is introduced into the inlet chamber and is filtered while passing through the filter medium of the bag filter, then moves to the discharge chamber through the opening part to be discharged, and the bag filter has air permeability decreased toward the opening part. According to the bag filter and the dust collector, it is possible to achieve a high collection performance and a stable operation even when using a long bag filter due to improvement of uniformity of the filtration velocity along the length of the bag filter.

3 Claims, 17 Drawing Sheets

[PRIOR ART]   [EMBODIMENTS OF THE PRESENT INVENTION]

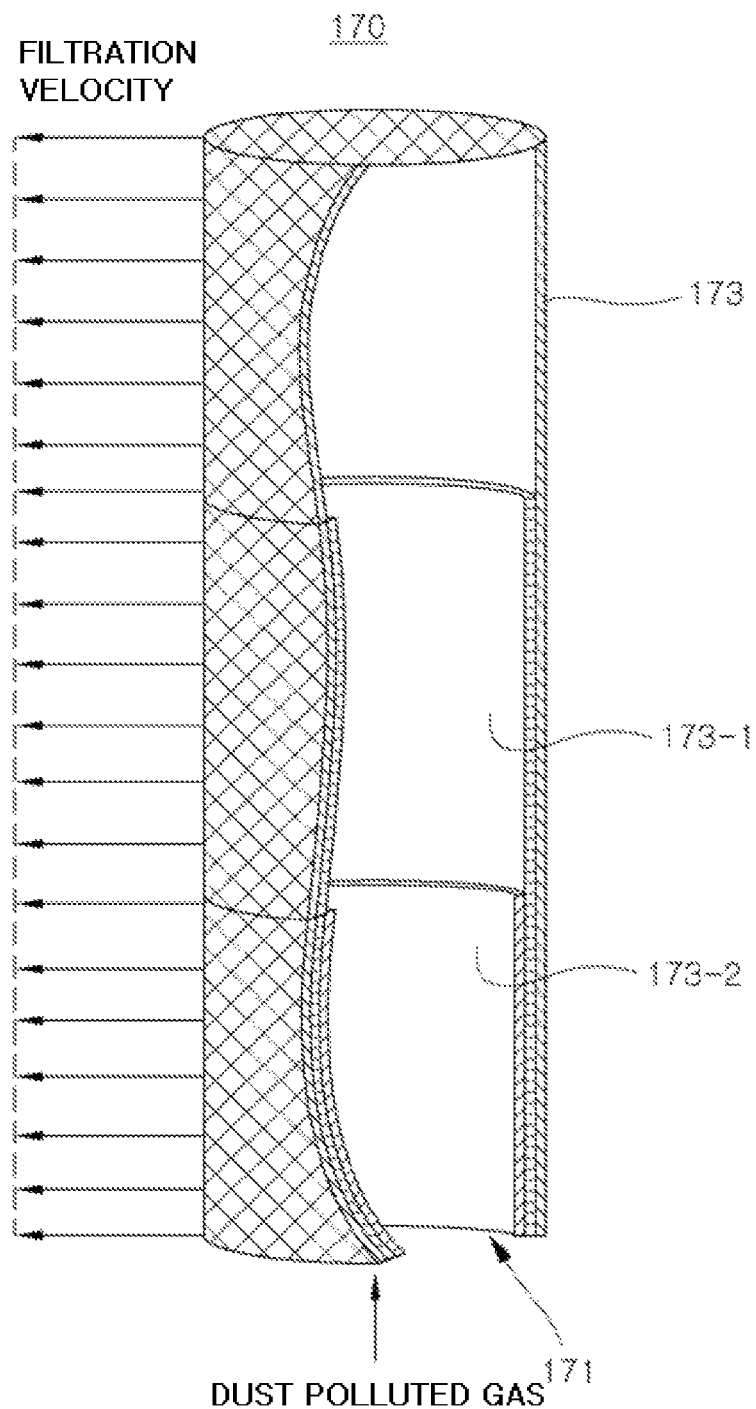

BAG FILTERS HAVING CONTROLLED AIR PERMEABILITY AND DUST COLLECTORS USING THE SAME

CROSS REFERENCE TO RELATED APPLICATIONS

This application claims priority to Korean Patent Application No. 10-2016-0011361, filed on Jan. 29, 2016 in the Korean Intellectual Property Office, the entire disclosure of which is incorporated herein by reference.

BACKGROUND OF THE INVENTION

Field of the Invention

The present invention relates to a dust collector device, and more particularly, to long bag filters that improve the non-uniformity of filtration velocity distribution along the length of the long bag filters by adjusting air permeability in the longitudinal direction of the bags, thereby improving filtration performance and reducing footprint and both of capital and operational costs of the dust collector using the long bag filters.

Description of the Related Art

Dust collectors using bag filters as a means of removing dust from gas stream occupy more than 80% in the market of small and medium size dust collectors. In accordance with the strengthening regulations for dust emission and working environments, a demand for industrial dust collectors has been gradually increased.

However, most industrial complexes in which many dust emitting companies gather have been in operation for more than 20 years since they were built, and the space for environmental facilities including filter dust collectors becomes saturated. Therefore, a plan for reducing the footprint of the filter dust collectors should be sought. For this, it is necessary to develop a dust collector that can be installed in a limited area and operated at low costs while maintaining high collection efficiency. As illustrated in FIG. 1, a typical dust collection system 1000 includes a dust source 200, a filter dust collector 100 and a blower 300.

A treatment gas containing dust generated from the dust source 200 moves to an inlet chamber 110 of the filter dust collector 100, is filtered through the bag filters 160, and moves to a discharge chamber 120. The blower 300 is connected to the discharge chamber 120 to form a negative pressure in the discharge chamber 120.

The bag filters 160 may be made of various materials in different shapes. However, a typical bag filter 160 is made of woven or nonwoven filter medium in a tubular shape, and has an opening part 161 and an inner space defined by the filter medium.

The bag filter 160 communicates with the discharge chamber 120 through the opening part 161 and a negative pressure is formed in the discharge chamber 120, such that the treatment gas in the inlet chamber 110 is introduced into the bag filter to be filtered while passing through the filter medium thereof, then moves to the discharge chamber 120 through the opening part 161 to be discharged.

A conventional filter dust collector mainly uses bag filters having a length of 3 m or less, but as described above, in order to reduce the footprint of the dust collector, long bag filters having a length of 10 m or more should be used. The footprint of a dust collector using 10 m long bag filters can be reduced by 50% or more as compared to a dust collector using bag filters having a length of 3 m, thereby reducing both of capital and operational costs.

However, a problem entailed in an application of long bag filters is that, as the bag filter length is increased, the filtration velocity of the treatment gas shows a severely biased distribution along the filter length.

A large unbalance occurs in a distribution of the filtration velocity along the bag filter length, which has a form that the filtration velocity is rapidly increased toward the opening part of bag filter and is rapidly decreased as it becomes further away from the opening part of bag filter. In this regard, as the length of bag filter is increased, such the phenomenon becomes more deteriorated (see FIGS. 2 and 3).

Herein, the filtration velocity refers to a velocity of the treatment gas introduced in a perpendicular direction to the filter medium. An average filtration velocity represents a flow rate of the treatment gas passing through unit surface area of bag filter, and a typical filter dust collector has an average filtration velocity in a range of 0.5 to 2.0 m/min.

A graph of FIG. 3 shows a filtration velocity distribution along the length of a bag filter having a diameter of 160 mm and a length of 3 m, 10 m and 15 m, respectively, at an average filtration velocity of 1.5 m/min. FIG. 3 is a graph illustrating the filtration velocity distribution, wherein a horizontal axis represents the bag filter length and a vertical axis represents the filtration velocity, respectively. That is, a value of 10 of the horizontal axis means that the bag filter opening part is located at a point of 10 m from a bottom of the bag filter. As illustrated in FIG. 3, in the case of the 10 m bag filter, about 70% of the treatment gas passes through the bag filter in the vicinity of the opening part which occupies about 30% of the entire filtration area.

This is equivalent to operating the bag filter having a length of about 3 m at an extremely higher filtration velocity than the typical filtration velocity, thus to be abnormally operated. In this case, the pressure drop across the 10 m long bag filter becomes much higher than that of 3 m long bag filter for the same average filtration velocity, and the filter medium of 10 m long bag becomes clogged only at a region of a high filtration velocity, resulting in shorter life-span of the bag filter and reduction of filtration performance. As a result, it is hard to expect to take advantages, which can be obtained by applying long bag filters, and the operation stability of the dust collector is deteriorated, such that the industrial process or the production process in which the treatment gas is generated may not be normally operated.

That is, since the treatment gas is filtered with being biased to a portion close to the opening part of the long bag filter, more amount of dust is deposited in the vicinity of the opening part in the entire length of the bag filter, and thereby reducing the life-span of the bag filter and increasing maintenance costs.

In general, in order to clean the dust loaded filters, pulse jet cleaning methods, which detach dust cake formed on the filter surface by instantaneously injecting a compressed air into the bag to physically inflate the bag filter, are largely used. If non-uniformity of filtration velocity in a longitudinal direction of the long bag filter is large, the dust is accumulated biasedly in the vicinity of the opening part of the bag filter, such that the filter cleaning frequency is decreased, which also causes a problem of shortening the life-span of the filter or increasing the operational costs.

As an example of the dust collector, there is a dust collecting apparatus using bag filters disclosed in Korean Patent Registration No. 10-1475866 (published on Dec. 23, 2014).

SUMMARY OF THE INVENTION

In consideration of the above-mentioned circumstances, it is an object of the present invention to provide dust collectors using long bag filters, capable of achieving reduced footprint and both capital and operational costs by improving non-uniformity of filtration velocity distribution along the length of long bag filters so that the filtration velocity is relatively equally distributed over the long filters as much as possible.

In order to achieve the above-described object, according to the present invention, there is provided a bag filter which is used for dust collectors to remove dust from a gas stream, and comprises a tubular filter medium whose one end is closed and the other end has an opening part through which a gas flows, wherein the filter medium is porous and configured to have air permeability decreased from the closed end toward the opening part of said filter bag.

Herein, the filter medium has a circular or a polygonal cross section. Further, the filter medium is divided into predetermined sections in a longitudinal direction thereof so as to have differently set air permeability for each section, and is configured to have air permeability decreased toward the opening part.

In addition, the filter medium is formed by longitudinally connecting a plurality of unit filter media which have different air permeabilities from each other, and are arranged so as to have air permeability decreased toward the opening part.

Further, the plurality of unit filter media are made of the same material as each other or different materials from each other. Further, the filter medium is configured such that one layer of the filter medium is formed on an outer surface or an inner surface near the closed end, and the number of the laminated layers of the filter medium is increased toward the opening part, so as to have air permeability decreased from the closed end toward the opening part.

Further, the outer surface or the inner surface of the filter medium is coated with a porosity control material.

Further, the porosity control material is a porous membrane or a detachable porous film.

Further, the porosity control material is a porous film, and the porous film is formed by a plurality of films having a predetermined width and a vertical length smaller than a circumferential length of the filter medium, and only an upper end thereof is adhered and a lower end is formed as a free end so as to cover at least a part of the outer surface near the opening part of the filter medium.

Further, the porous film is adhered to the outer surface of the filter medium so as to form a plurality of columns in the longitudinal direction of the filter medium.

Further, the porous film adhered in the plurality of columns is configured to have air permeability decreased toward a film arranged in a column near the opening part.

Furthermore, the films longitudinally adjacent to each other are adhered in a form of partially overlapped with each other.

According to another aspect of the present invention, there is provided a dust collector including: a chamber divided into an inlet chamber and a discharge chamber by a barrier; and the bag filter according to claim 1 which is installed inside of the inlet chamber, and is formed in a shape having an inner space, of which one end is opened as an opening part and the other end is closed by a filter medium, so as to communicate with the discharge chamber through the opening part, wherein a treatment gas is introduced into the inlet chamber and is filtered while passing through the filter medium of the bag filter, then moves to the discharge chamber through the opening part to be discharged.

According to the present invention, the treatment gas passes through the bag filter from an inside to an outside, or from the outside to the inside.

According to the present invention, there is provided a dust collector capable of securing a stable operation and an excellent collection performance even when using long bag filters due to the filtration velocity being relatively equally formed over the filter length by controlling air permeability in the longitudinal direction of the long bag filters, and reducing capital and operational costs thereof, while largely decreasing the footprint of the dust collector on the basis of the above-described advantages.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
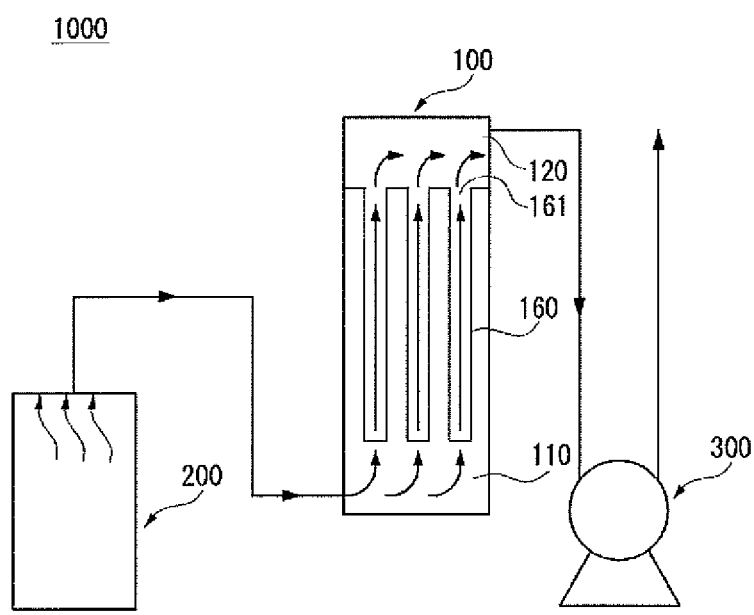
FIG. 1 is a schematic diagram illustrating a typical dust collection system.
Figure 2:
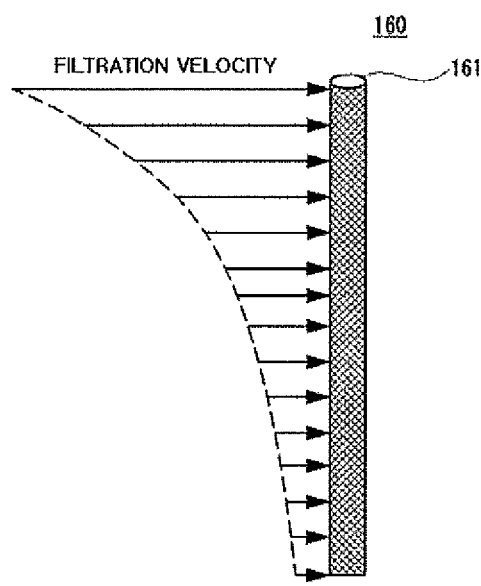
FIG. 2 is a view illustrating a filtration velocity distribution in a longitudinal direction of a long bag filter.

Hereinafter, embodiments of the present invention will be described in detail with reference to the accompanying drawings so that they can be easily practiced by those skilled in the art to which the present invention pertains. However, in description of preferred embodiments of the present invention, the publicly known functions and configurations that are judged to be able to make the purport of the present invention unnecessarily obscure will not be described in detail. In addition, identical or similar reference numerals will be denoted to portions performing similar functions and operations throughout the accompanying drawings.

Figure 4:
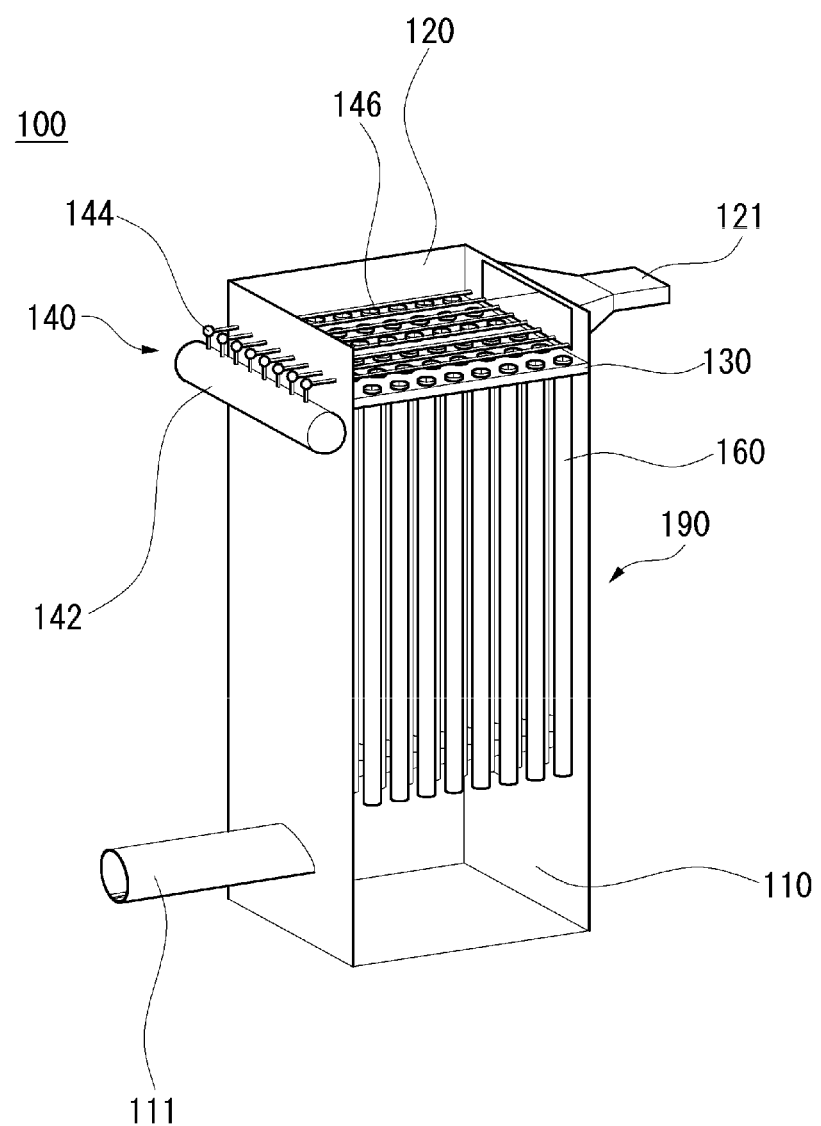
FIG. 4 is a view illustrating a dust collector according to a first embodiment of the present invention.

FIG. 4 is a partially cutaway perspective view illustrating a dust collector according to a first embodiment of the present invention. Referring to FIG. 4, the dust collector includes: a chamber 190 which is divided, by a barrier 130, into an inlet chamber 110 into which a gas to be treated (hereinafter, 'treatment gas') is introduced from an outside, and a discharge chamber 120 in which the filtered gas is introduced then discharged; a plurality of bag filters 160 which are installed in the inlet chamber 110 to filter the treatment gas; and a pulse-jet type filter cleaning device 140 is configured to burst a compressed air into inner spaces of the bag filters 160 through the inlet chamber 110 to remove dust cake formed on the outer surfaces of the bag filters 160.

The inlet chamber 110 is connected with one end of an inlet pipe 111, and the other end of the inlet pipe 111 is connected to a dust source (not illustrated). Therefore, the treatment gas containing dust generated from the dust source is introduced into the inlet chamber 110 through the inlet pipe 111.

The discharge chamber 120 is formed above the inlet chamber 110 with the barrier 130 interposed therebetween to define a space in which clean gas filtered through the bag filters 160 is collected, and is provided with a discharge pipe 121, such that the clean gas filtered while passing through the bag filters 160 is discharged to the outside of the apparatus through the discharge pipe 121. In a middle of the discharge pipe 121, a blower (not illustrated) or a fan (not illustrated) is installed, such that a negative pressure is formed in the discharge chamber 120 by operation of these blowing devices.

Figure 5:
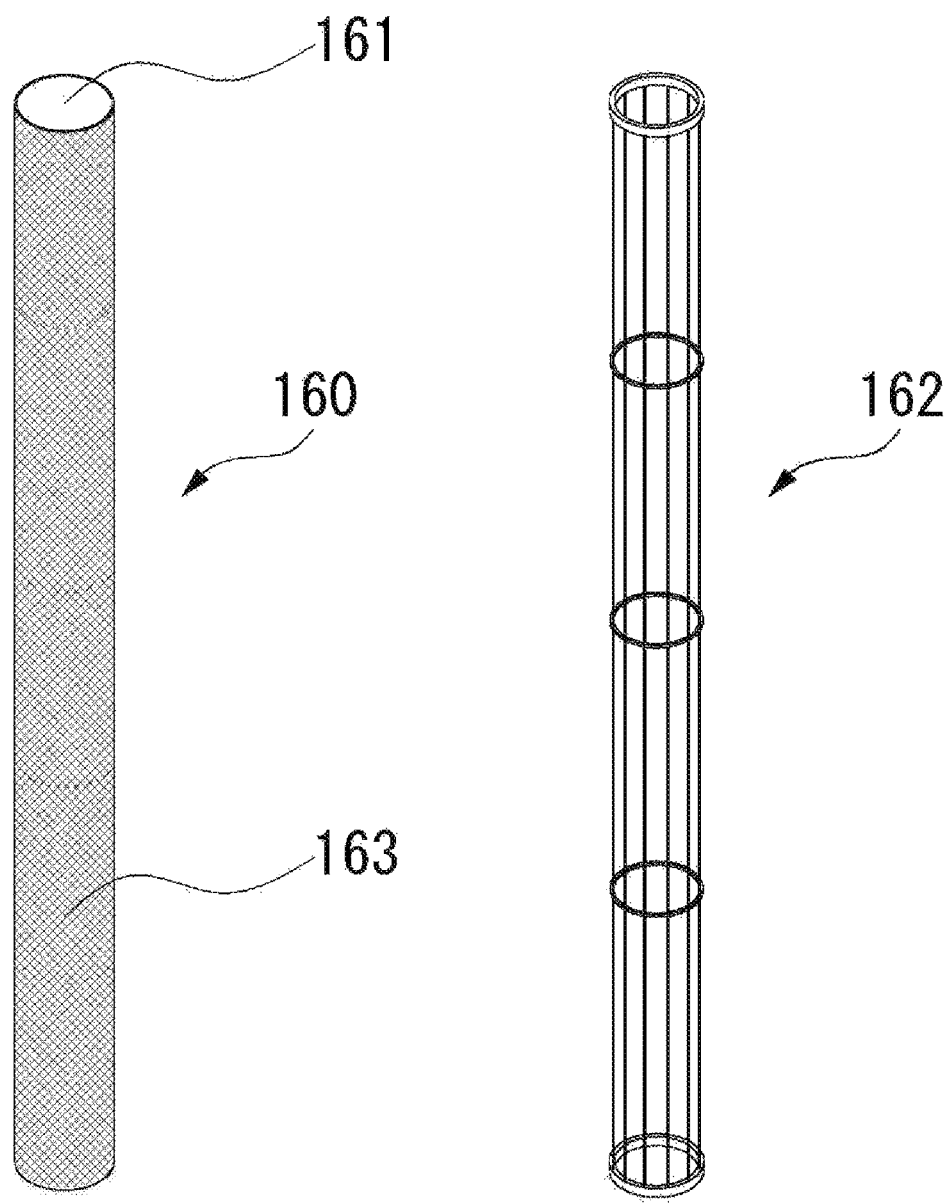
FIG. 5 is a view illustrating a bag filter according to the first embodiment of the present invention.

As illustrated in FIG. 5, the bag filter 160 is formed in a tubular body including an inner space, a closed lower end, and an upper opening part 161 opened at an upper end, which are defined by the filter medium 163. For example, the bag filter has a polygonal or a circular cross section. When the filter medium 163 is made of a material that cannot be formed and maintained in a form itself, a cage 162 is used so that the bag filter 160 is maintained in a specific form. The cage 162 is formed in a tubular shape, in which a plurality of rings are longitudinally spaced apart from each other, and a plurality of rod frames are formed at an interval along a circumference of the rings as a vertical member to connect the plurality of rings, so as to form circular opening parts at opposite ends, and grid opening parts at the circumference, and is inserted into the inner space of the bag filter 160 through the upper opening part 161.

The filter medium 163 may be made of various materials such as an artificial or natural fibrous woven or nonwoven fabric, a membrane, a porous ceramic, etc., and further may be made of any materials such as an organic material, an inorganic material, a metal material, or the like. When the treatment gas passes through the filter medium 163, the dust is filtered.

As a result, the bag filter 160 has a tubular shape in which the inner space and the opening part 161 are formed by the filter medium 163.

The bag filters 160 are installed in the inlet chamber 110, and the upper portions thereof are connected with the barrier 130 to communicate with the discharge chamber 120 through the upper opening parts 161. Accordingly, a negative pressure is formed in the inner spaces of the bag filters 160. The negative pressure is increased toward the upper opening parts 161.

When operating the blower (not illustrated), air filled in the discharge chamber 120 and the inner spaces of the bag filters 160 is discharged to the outside to form a negative pressure in the discharge chamber 120 and the inner spaces of the bag filters 160, and a difference in a pressure between the inlet chamber 110 and the discharge chamber 120 occurs due to the negative pressure formed therein. Thereby, the treatment gas containing dust generated from the dust source is introduced into the inlet chamber 110 through the inlet pipe 111 and is introduced into the inner spaces of the bag filters 160 by passing through the bag filters 160, so that the dust suspended in treatment gas is filtered. Then, the filtered gas moves to the discharge chamber 120 through the upper opening parts 161 to be discharged to the outside.

Figure 6:
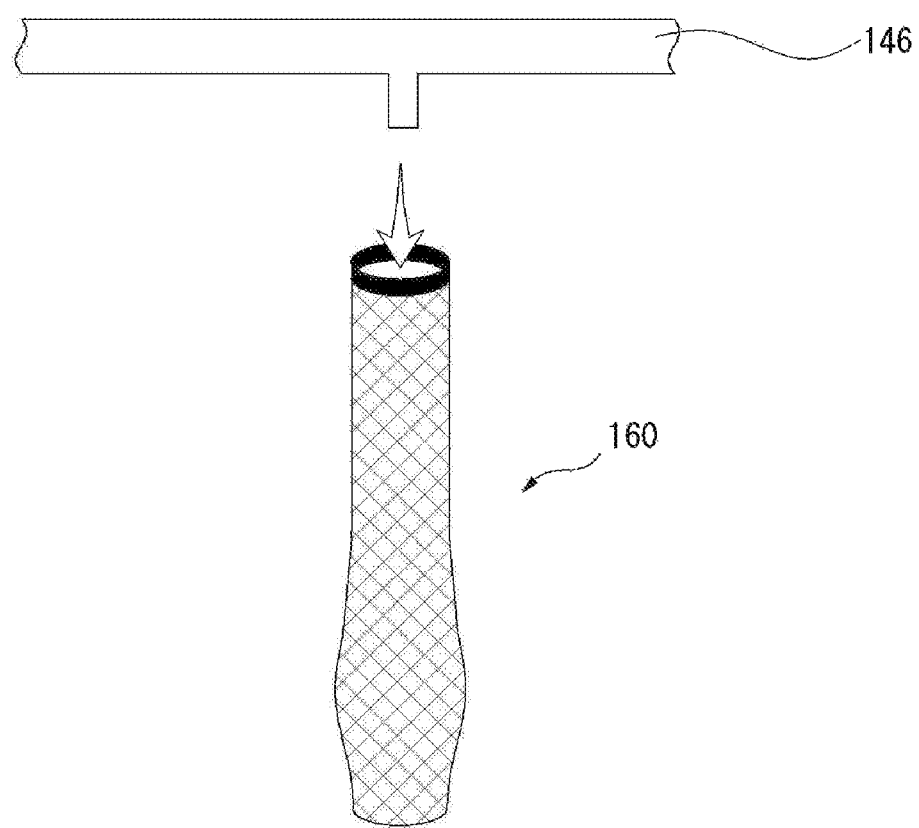
FIG. 6 is a view illustrating a pulse-jet filter cleaning of the dust collector according to the first embodiment of the present invention.

The pulse jet filter cleaning device 140 includes a compressed air storage tank 142, and blow tubes 146 which are connected with diaphragm valves 144 and include nozzles for injecting the compressed air toward the respective inner spaces of the bag filters 160. The diaphragm valves 144 are capable of being selectively opened and closed. One side of each diaphragm valve 144 is connected to the compressed air storage tank 142, and the other side is connected to the blow tube 146. Therefore, during a filter cleaning process, the diaphragm valves 144 are selectively opened, such that the compressed air is transmitted to the blow tubes 146 from the compressed air storage tank 142 through the diaphragm valves 144, and is injected toward the inner spaces of the bag filters 160 through the nozzles installed in the blow tubes 146. The nozzles instantly inject the compressed air to inflate the bag filters 160, thereby dislodging the dust cake formed on the outer surface of the bag filter (see FIG. 6).

Figure 7:
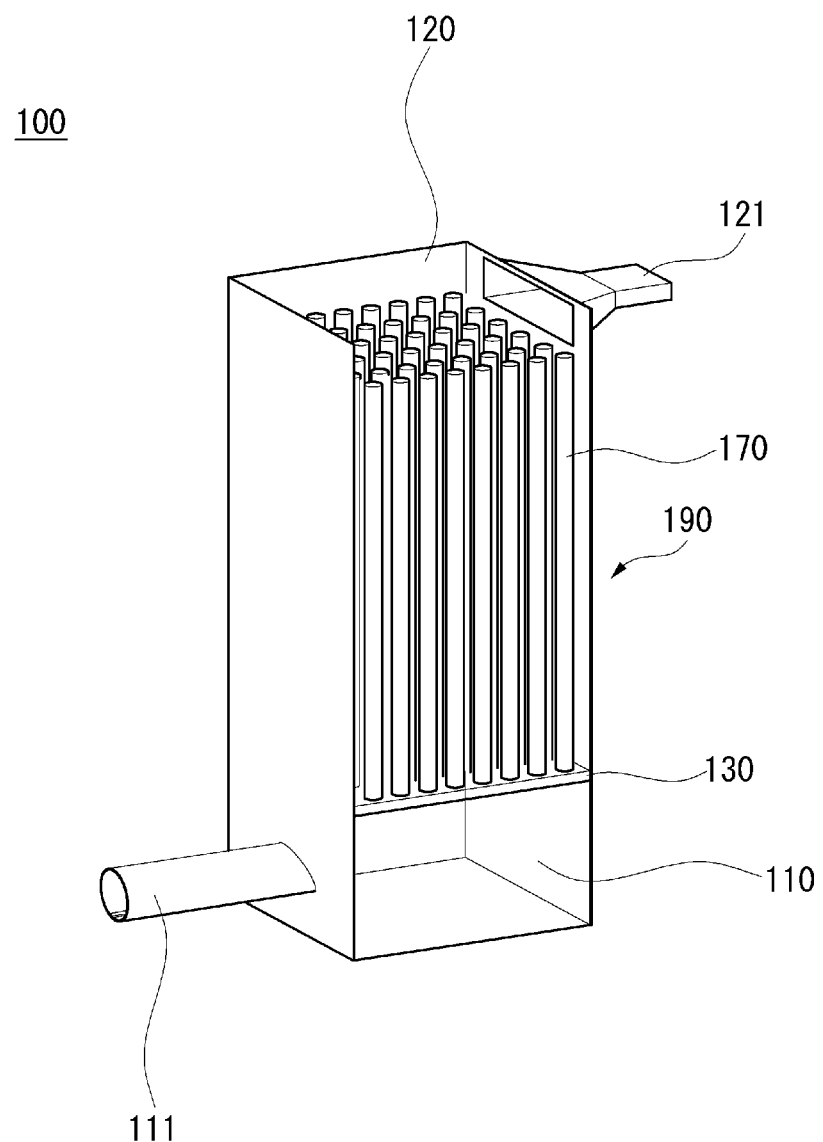
FIG. 7 is a view illustrating a dust collector according to a second embodiment of the present invention.

FIG. 7 is a partially cutaway perspective view illustrating a dust collector according to a second embodiment of the present invention. Referring to FIG. 7, the dust collector includes: a chamber 190 which is divided, by a barrier 130, into an inlet chamber 110 and a discharge chamber 120; and a plurality of bag filters 170 which are installed in the discharge chamber 120 located at an upper side of the chamber 190 and are opened toward the inlet chamber 110 at a lower side of the chamber 190 to communicate therewith, so as to filter the treatment gas.

The inlet chamber 110 is connected with one end of an inlet pipe 111, and is connected to a dust source (not illustrated) through the other end of the inlet pipe 111. Therefore, the treatment gas containing dust generated from the dust source is introduced into the inlet chamber 110 through the inlet pipe. The treatment gas is forcibly introduced into the inlet chamber 110 by a blower (not illustrated) or a fan (not illustrated) to form a positive pressure therein.

The discharge chamber 120 is formed above the inlet chamber 110 with the barrier 130 interposed therebetween to define a space in which the clean gas filtered through the bag filters 170 is collected, and is provided with a discharge pipe 121, such that the clean gas filtered through the bag filters 170 is discharged to the outside through the discharge pipe 121.

Figure 8:
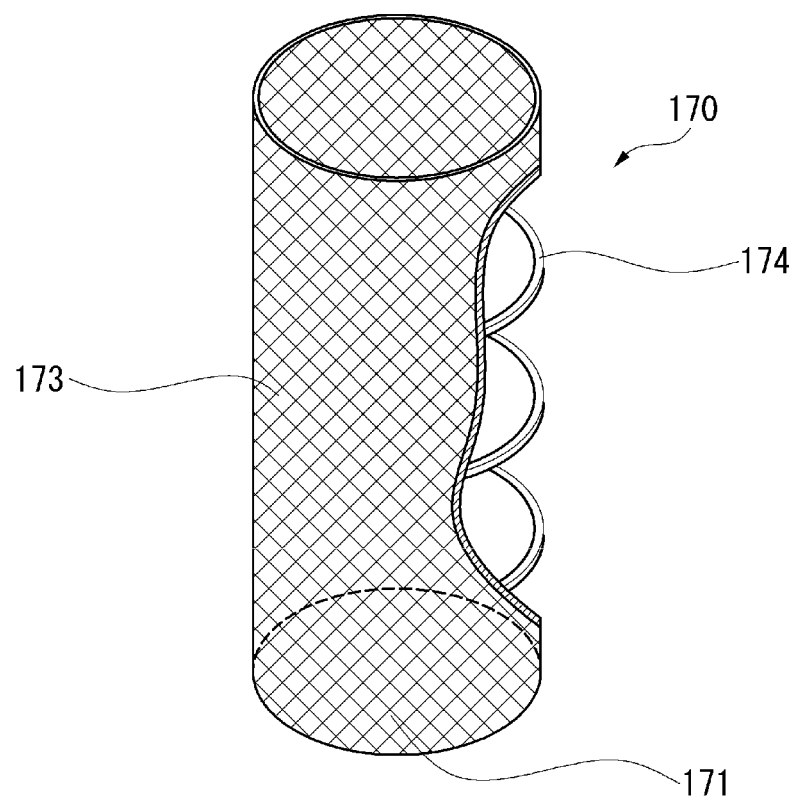
FIG. 8 is a view illustrating a bag filter according to the second embodiment of the present invention.

As illustrated in FIG. 8, the bag filter 170 includes a tubular filter medium 173 having an opening part formed in a lower end thereof, and a plurality of auxiliary rings 174 installed at the filter medium 173 in the longitudinal direction thereof vertically spaced apart from each other (for this, a plurality of additional vertical rods may be used) so as to maintain a form of the bag filter 170.

The bag filter 170 is fixed in a form in which an upper portion thereof is vertically erected inside of the discharge chamber 120 by various means, and is maintained in the erected shape by the auxiliary rings 174 installed at the filter medium 173.

As a result, the bag filter 170 has a tubular shape in which the inner space and a lower opening part 171 are formed by the filter medium 173.

The bag filters 170 are installed in the discharge chamber 120, and the lower portions thereof are connected with the barrier 130 to communicate with the inlet chamber 110 through the lower opening parts 171. Accordingly, a positive pressure is formed in the inner spaces of the bag filters 170. The positive pressure is increased toward the lower opening parts 171.

A difference in a pressure between the inlet chamber 110 and the discharge chamber 120 occurs due to the positive pressure formed in the bag filters 170. Thereby, the treatment gas containing dust is introduced into the inlet chamber 110 from the dust source through the inlet pipe 111 and moves to the inner spaces of the bag filters 170 through the lower opening parts 171. Then, the cleaned treatment gas is introduced into the discharge chamber 120 by passing through the filter media 173 of the bag filters 170, and is discharged to the outside through the discharge pipe 121. In this case, dust suspended in treatment gas is filtered while passing through the filter media 173.

The dust collector according to the second embodiment of the present invention has a difficulty to employ the pulse jet cleaning method of injecting the compressed air into the filter media to remove the dust cake as in the first embodiment, due to a structural aspect thereof, a flow direction of the treatment gas, and a portion in which the dust is deposited (an inner surface of filter medium). Accordingly, it is possible to use a reverse airflow cleaning method for moving the gas inversely to the dust collection operation, or a vibration method for generating physical vibration in the bag filters 170. These methods are not directly related to the technical features of the present invention, and therefore will not be described in detail.

The dust collectors according to the first and second embodiments of the present invention have been described above. The dust collector of the first embodiment has the form in which the treatment gas is filtered while passing from the outside to the inside of the bag filters 160, and is discharged from the upper opening parts 161, and the dust collector of the second embodiment has the form in which the treatment gas is introduced into the bag filters 170 through the lower opening parts 171 and is filtered while passing from the inside to the outside thereof.

Figure 3:
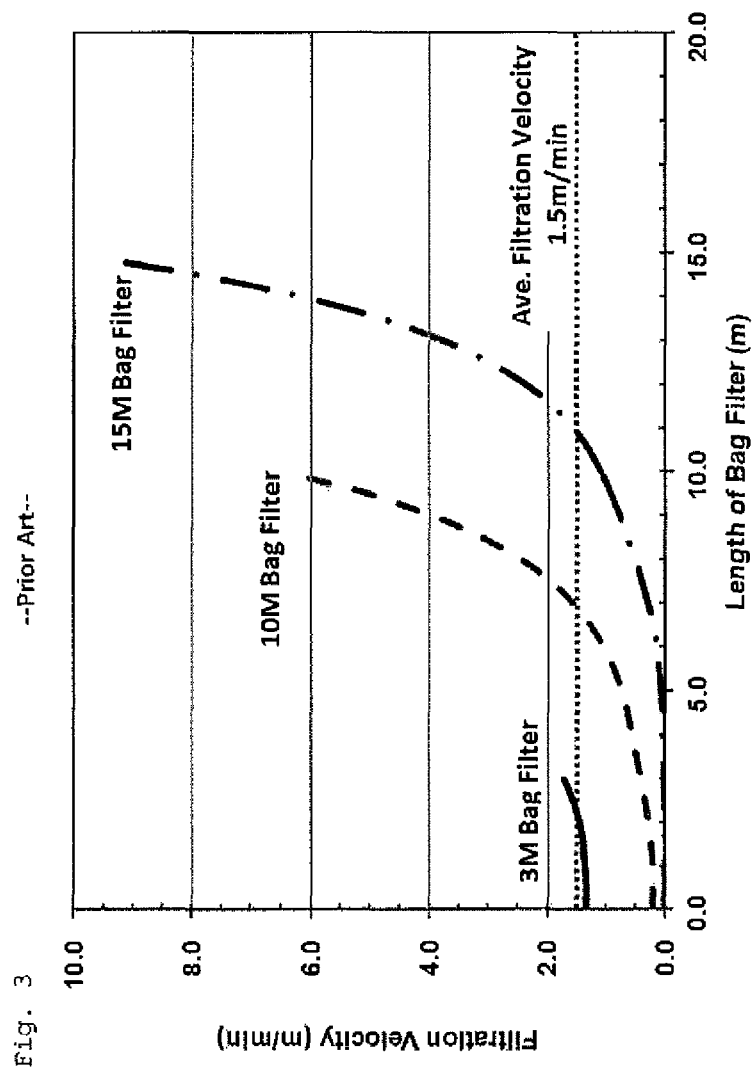
FIG. 3 is a graph illustrating the filtration velocity distribution along the length of bag filters having a length of 3 m, 10 m and 15 m, respectively.

The filtration is driven by a difference in the pressure between the inside and the outside of the bag filters 160 and 170, and the pressure difference is the largest at the opening parts 161 and 171 of the bag filters 160 and 170 regardless of the first embodiment and the second embodiment. Therefore, in a case of the conventional bag filter, there is a problem that the filtration velocity is rapidly increased toward the opening parts. In particular, as illustrated in FIG. 3, as the length of the bag filter is increased, the filtration velocity is rapidly increased in the vicinity of the opening part.

In order to solve the above-described problem, the bag filters 160 and 170 according to the first and second embodiments of the present invention are designed in such a manner that the filtration velocity is not rapidly increased at the opening parts 161 and 171, and relatively equally distributed across the entire length of the bag filters 160 and 170 (the term "equally" used in the present invention means that the uniformity of the filtration velocity along the filter length is greatly reduced compared to the conventional bag filter, rather than equality in a mathematical meaning), which may be accomplished through the control of the air permeability of the filter medium.

Figure 9:
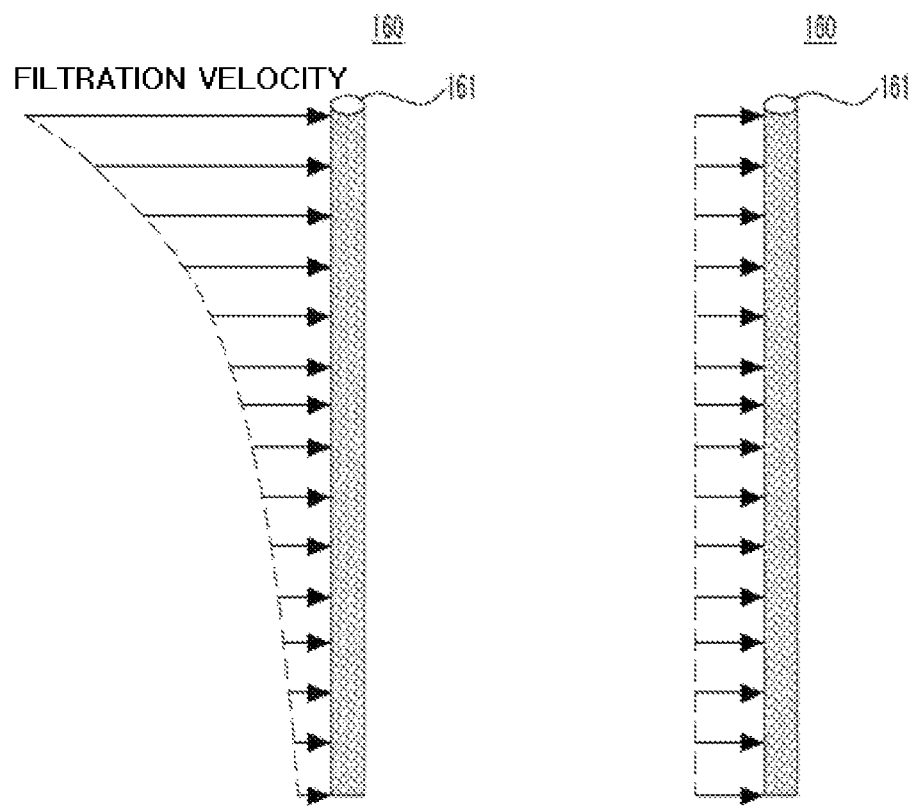
FIG. 9 is a view illustrating a comparison between the filtration velocity distribution of a conventional long bag filter and that of the long bag filter according to the embodiments of the present invention.

FIG. 9 is a view illustrating a comparison between the filtration velocity distribution of the conventional bag filter 160 and the filtration velocity distribution of the bag filter 160 according to the embodiments of the present invention. More specifically, as illustrated in FIG. 9, in the case of the conventional bag filter, the filtration velocity is increased at the portion close to the opening part so that filtration intensively occurs in the vicinity of the opening part, and thereby causing a deviation in filtration. However, the bag filters 160 and 170 according to the first and second embodiments of the present invention are designed in such a manner that the air permeability (which relates a degree of difficulty or ease in gas passing therethrough, wherein if the air permeability is high, it is easy to pass the gas, and if the air permeability is low, it is difficult to pass the gas) is decreased toward to the opening parts 161 and 171. Therefore, less of the gas passes through the vicinity of the opening part due to higher gas resistance forced by lower permeable filter media. Thus, as illustrated in FIG. 9, the uniformity of filtration velocity along the length of bag filters 160 and 170 is relatively improved.

FIG. 10 is views illustrating, in forming the bag filters 160 and 170 according to the first and second embodiments of the present invention, examples of a configuration in which a plurality of unit filter media 163a to 163e and 173a to 173e having different air permeabilities for each section in the longitudinal direction of the filter medium are connected to each other to form one filter medium 163 or 173.

Figure 10A:
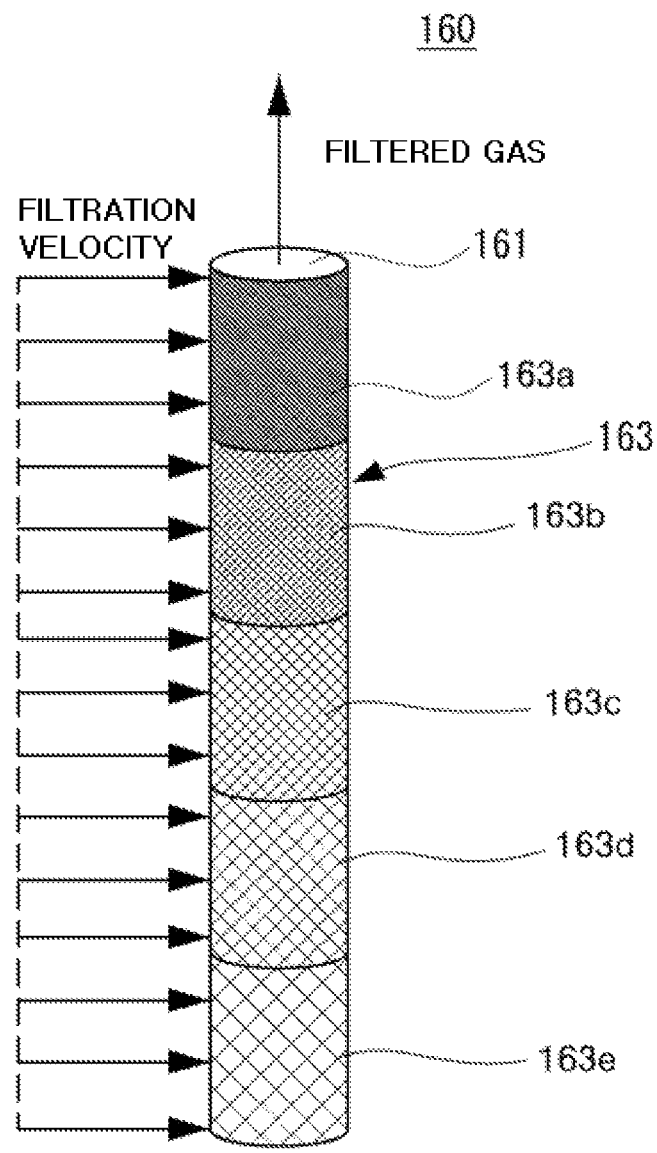
FIG. 10 includes FIG. 10A and FIG. 10B which are views illustrating a filtration velocity distribution of a bag filter formed by longitudinally connecting a plurality of unit filter media which have different air permeabilities from each other according to the embodiments of the present invention.

As illustrated in FIG. 10A, the bag filter 160 of the first embodiment is formed by connecting a plurality of unit filter media 163a to 163e having different air permeabilities with each other to form one filter medium 163. By using a filter medium having decreased air permeability toward the upper opening part 161 in the longitudinal direction (the air permeability is decreased in an order of 163a<163b<163c<163d<163e), the filtration velocity in the longitudinal direction of the bag filter becomes uniform (the filtration velocity has a relationship of 163a≈163b≈163c≈163d≈163e).

Figure 10B:
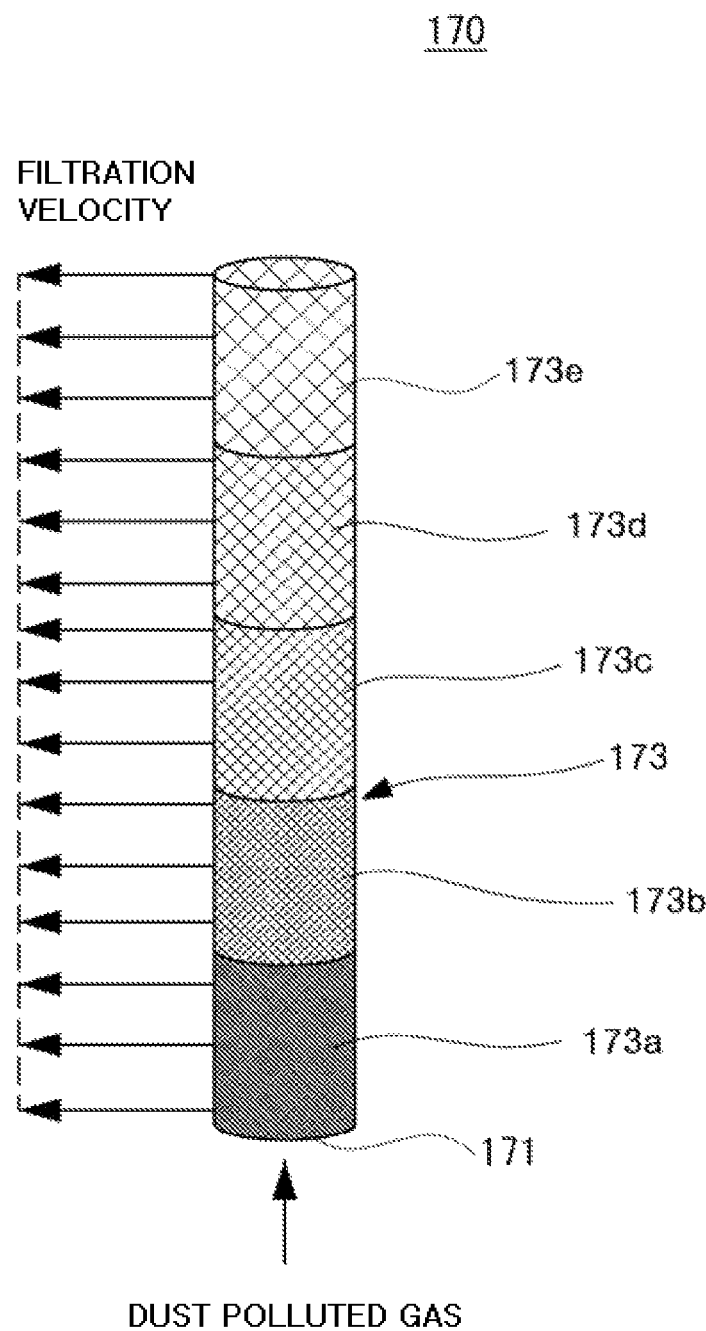

Meanwhile, the bag filter 170 of the second embodiment illustrated in FIG. 10B is formed by connecting a plurality of unit filter media 173a to 173e having decreased air permeability toward the lower opening part 171 in the longitudinal direction (the air permeability is decreased in an order of 173a<173b<173c<173d<173e) with each other to form one filter medium 173.

In this way, since the air permeability of the filter medium is relatively decreased toward the opening parts 161 and 171, the uniformity of the actual filtration velocity is greatly improved between the upper and lower portions of the bag filters 160 and 170, compared to the conventional bag filter.

FIG. 11 is views illustrating examples in which the number of the laminated layers of the filter media 163 and 173 in the bag filters 160 and 170 according to the first and second embodiments is varied along the position in the longitudinal direction.

Figure 11A:
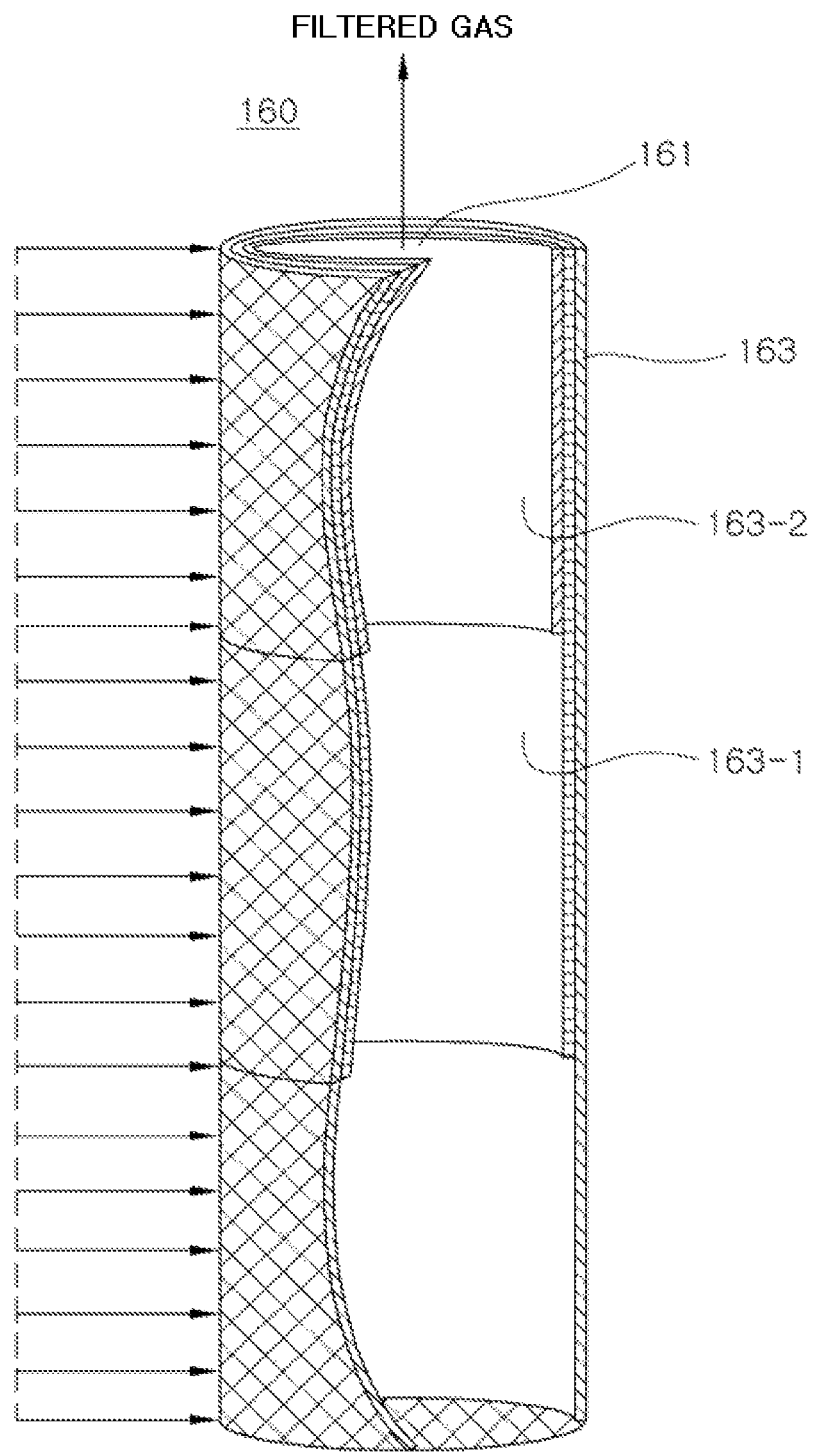
FIG. 11 includes FIG. 11A and FIG. 11B which are views illustrating a filtration velocity distribution of a bag filter having a filter medium which is partially layered and laminated with three filter media according to the embodiments of the present invention.

As illustrated in FIG. 11A, the bag filter 160 of the first embodiment is arranged in such a manner that the number of the laminated layers of filter medium 163 is gradually increased toward the upper opening part 161 in the longitudinal direction. That is, the bag filter 160 is designed in such a manner that the number of the laminated layers of the filter medium 163 is increased toward the upper opening part 161 in the longitudinal direction, thus to decrease the air permeability. For this, the filter media 163-1 and 163-2 having different lengths from each other are laminated so that a substantial thickness of the filter media is increased in the side of the upper opening part 161, and the number of the laminated layers is decreased so that the thickness of the filter media is reduced toward the lower end.

On the other hand, the bag filter 170 of the second embodiment illustrated in FIG. 11B is arranged in such a manner that the number of the laminated layers of filter media 173 is gradually increased toward the lower opening part 171 in the longitudinal direction. That is, the bag filter 170 is designed in such a manner that the number of the laminated layers of the filter medium 173 is increased toward the lower opening part 171 in the longitudinal direction, briefly, for example, the lower end portion thereof is formed by three layers of filter media 173, 173-1 and 173-2, the middle portion thereof is formed by two layers of filter media 173 and 173-1, and the upper end portion thereof is formed by one layer of filter medium 173, so that permeability of the bag filter is reduced toward the lower opening part 171.

As described above, since the permeability of the bag filter is reduced toward the opening parts 161 and 171, the non-uniformity of the actual filtration velocity is greatly reduced between the upper and lower portions of the bag filters 160 and 170, compared to the conventional bag filter.

FIG. 12 is views illustrating examples in which the filter media 163 and 173 of the bag filters 160 and 170 according to the first and second embodiments are covered with a porosity control material. As the porosity control material, a filter medium coating material, or the like known in the art may be used, and in some cases, a separation detachable membrane may be adhered and covered. FIG. 12 shows an example of the present invention, in which the filter medium is coated by a porosity control material.

Figure 12A:
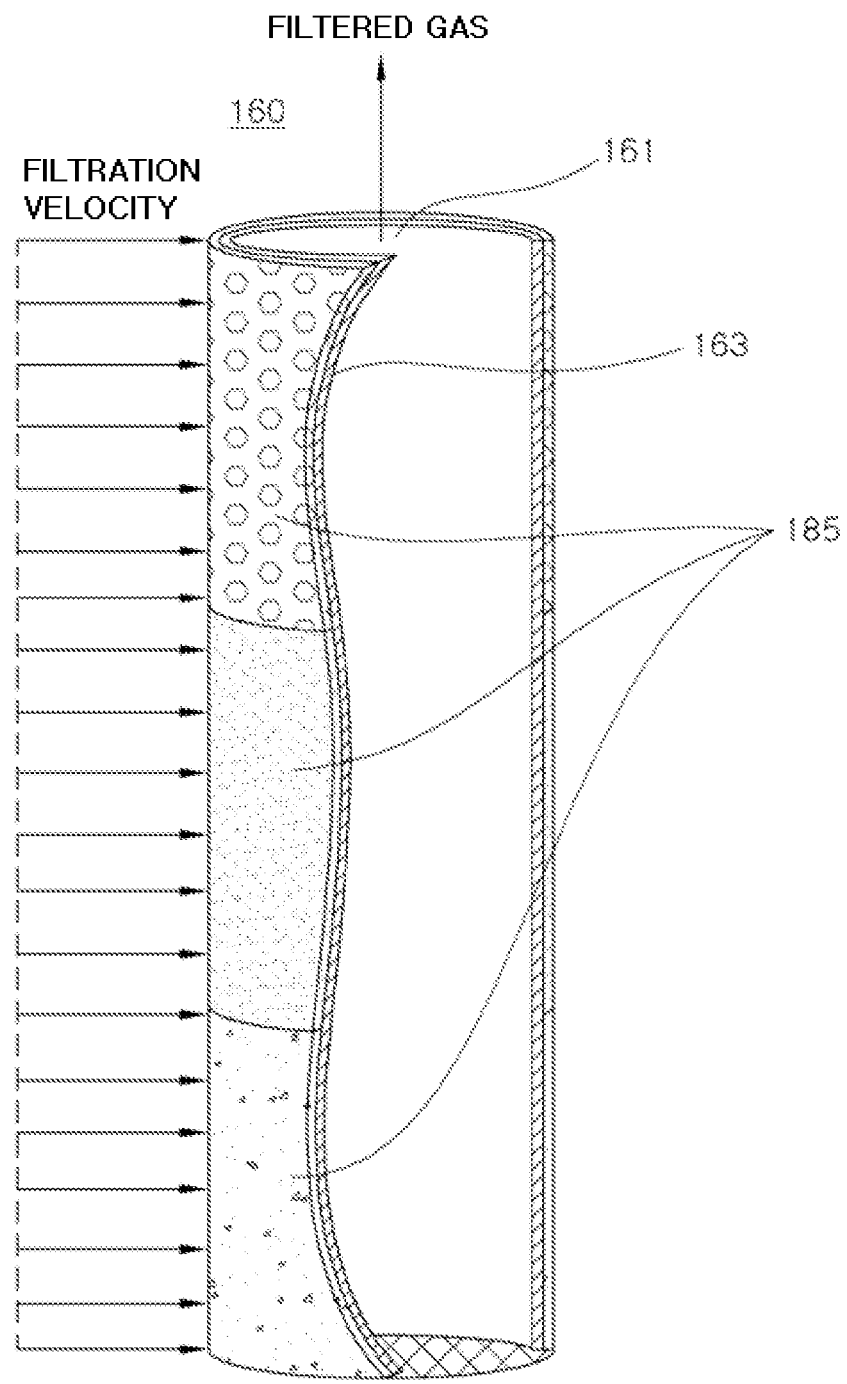
FIG. 12 includes FIG. 12A and FIG. 12B which are views illustrating a filtration velocity distribution of a bag filter having a filter medium coated with a porosity control material according to the embodiments of the present invention.

As illustrated in FIG. 12A, a porosity control material 185 having a low porosity was applied to the upper opening part 161 in the longitudinal direction of the bag filter 160 according to the first embodiment. That is, the porosity of the filter medium 163 covered with the porosity control material 185 is decreased toward the upper opening part 161 in the longitudinal direction, thereby reducing the air permeability.

The porosity control material 185 may be applied to the inside of the filter medium 163 or may be applied to the outside. As illustrated in FIG. 12A, it is preferable that the porosity control material 185 is applied to the outer surface thereof. The reason is that, the bag filter 160 of the first embodiment allows the treatment gas to be filtered while passing through the same from the outside to the inside.

Figure 12B:
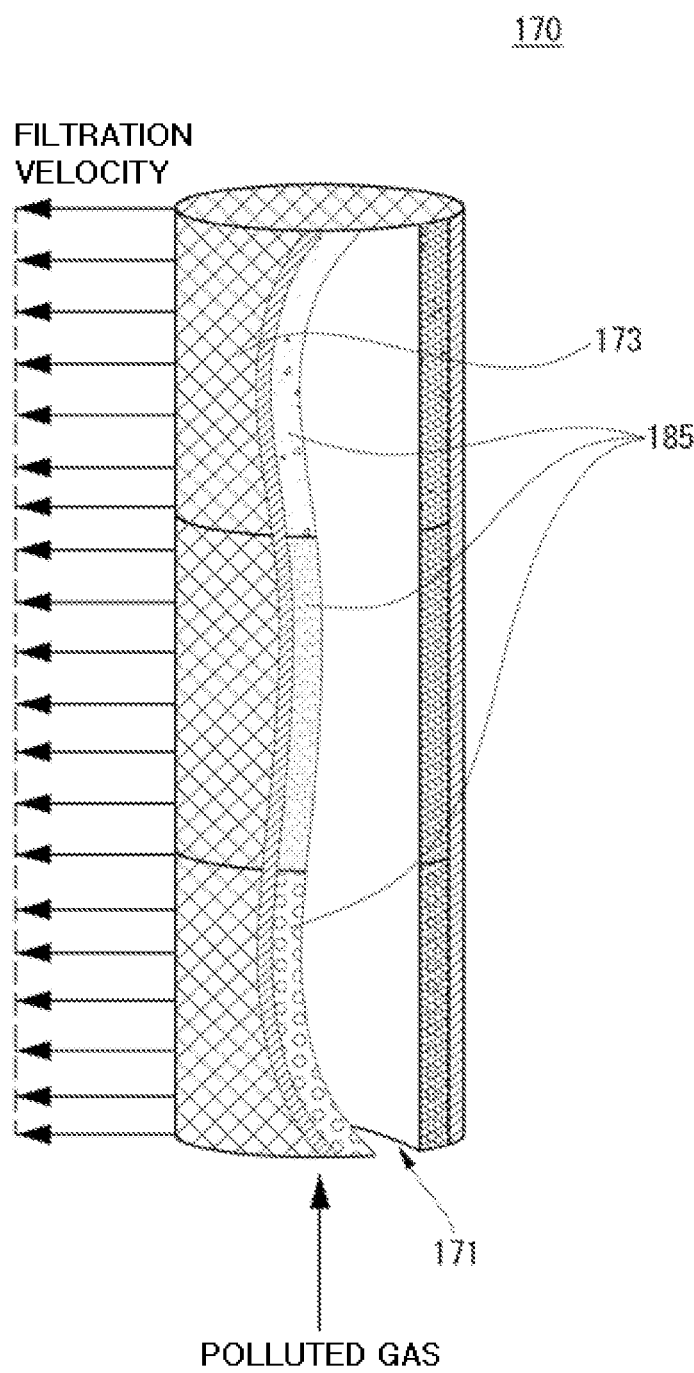

Conversely, in the bag filter 170 of the second embodiment illustrated in FIG. 12B, the porosity control material 185 having a low porosity is applied to the lower opening part 171 in the longitudinal direction. That is, the porosity of the filter material 173 is reduced by the porosity control material 185 toward the lower opening part 171 in the longitudinal direction, thereby reducing the air permeability.

The porosity control material 185 may be applied to the inside of the filter medium 173 or applied to the outside, and may be a solid material obtained by drying an curing the liquid phase material coated on the filter medium 173. Alternately, the coating may be a porous membrane or a porous film shape. Further, it is preferable that the porosity control material 185 is applied to the outer surface of the filter medium as illustrated in FIG. 12B. The reason is that, the bag filter 170 of the second embodiment allows the treatment gas to be filtered while passing through the same from the inside to the outside.

Since the air permeability is reduced toward the opening parts 161 and 171 by applying the porosity control material as the coating material, the actual filtration velocity may be equally maintained across the entire length of the bag filters 160 and 170 in the longitudinal direction.

Hereinafter, an example, in which the air permeability is controlled by adhering a porous film as the porosity control material which may be applied to the first embodiment of the present invention, will be described.

Figure 13:
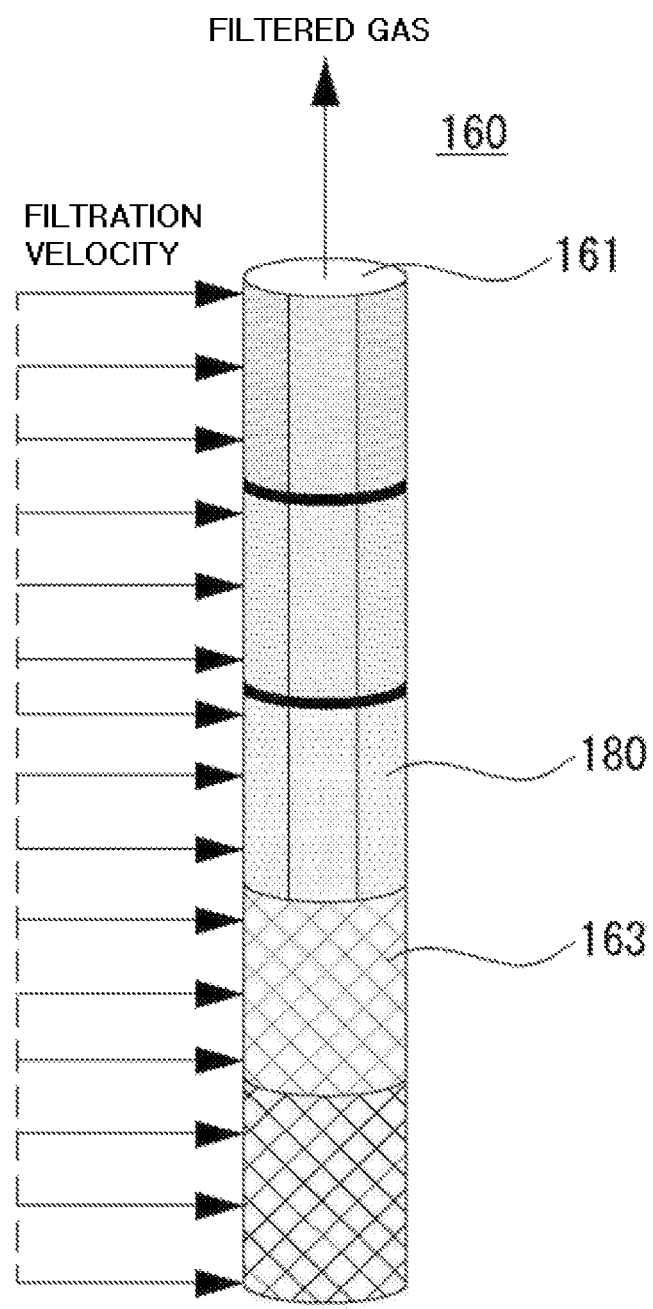
FIG. 13 is a view illustrating a filtration velocity distribution of a bag filter having films adhered thereto according to the first embodiment of the present invention.

FIG. 13 is a view illustrating a bag filter according to the first embodiment of the present invention to which the porous film is adhered.

The porous film 180 is adhered to an entire or a part of the surface of the filter medium 163 in a rectangular shape to control the air permeability. The porous film may be made of various materials such as polypropylene, polystyrene, or the like as a film known in the art, and has different sizes or distributions of the pores formed in the film from each other so as to have different air permeability for each film.

In the first embodiment of the present invention, the porous film 180 is adhered to only the upper portion of the bag filter 160 having a high filtration velocity. A plurality of porous films 180 are adhered to the upper side of the bag filter 160, so that upper, lower, right and left columns are aligned in the circumferential direction, and rectangular long sides are arranged in the longitudinal direction of the bag filter 160. Further, since the filtration velocity of the film is increased toward the upper opening part 161, the porous film 180 is configured to have air permeability decreased toward a film arranged in a column near the upper opening part 161.

In addition, only the upper portion of the porous film 180 is adhered to the surface of the bag filter 160, and the films vertically adjacent to each other are adhered in a form of partially overlapped with each other. That is, the lower portion of the upper film is laminated on a part of the upper portion of the lower film.

Since the porous films vertically adjacent to each other are partially overlapped with each other, the surface of the bag filter 160 may be completely covered.

Figure 14:
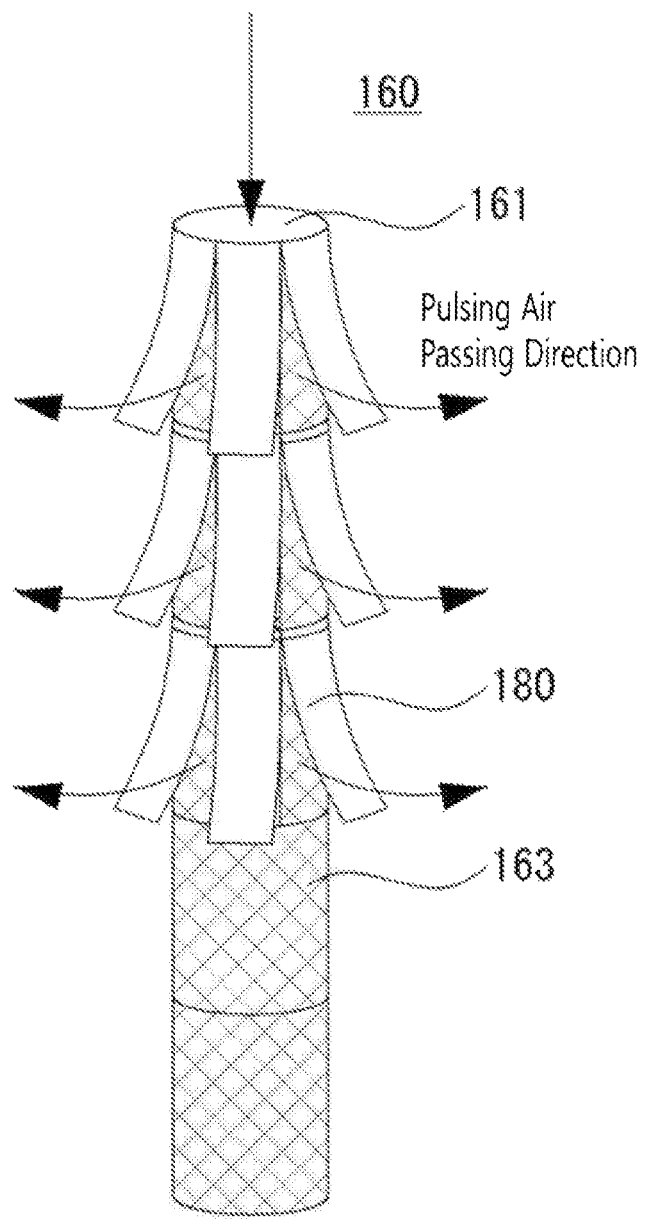
FIG. 14 is a view illustrating a pattern of pulsing air flow of a bag filter having films adhered under pulse jet cleaning operation according to the embodiments of the present invention.

FIG. 14 is a view illustrating the bag filter 160 according to the first embodiment of the present invention at a moment of filter cleaning process. A pulsing air flow is burst by instantaneously injecting the compressed air through the nozzles of blow tubes 146 as described above, and the bag filters 160 are inflated by the pulsing air flow, thus to remove the dust cake on the filter.

The pulsing air caused by injection of compressed air is introduced into the bag filter 160 through the opening part 161, passes through the filter medium 163, and then is discharged to the outside.

As illustrated in FIG. 14, only the upper portion of the film 180 is adhered to the outer surface of the bag filter 160 according to the first embodiment of the present invention. Therefore, during the normal filtration operation, the film 180 is adhered to the outer surface of the bag filter 160 due to the negative pressure applied thereto. However, when removing the dust cake formed on the outer surface of the bag filter, a direction of the airflow is changed to the reverse direction, such that the lower end portion of film is spaced apart from the outer surface of the bag filter 160 so as to adapt itself to the reverse flow due to the pulsing air. More specifically, the upper portion of the film 180 is firmly adhered to the outer surface of the bag filter 160, but the other portions thereof are not adhered. Therefore, when high-pressure air passes through the wall of the filter medium 163 due to the high-pressure air being intermittently applied to the inside of the filter, the lower end of the film is separated and fluctuated from the surface of the bag filter 160 by the air pressure so as to inflate.

As a result, the filter cleaning process for removing the dust cake formed on the outer surface of the bag filter 160 may be smoothly performed. Further, since the air permeability of the portion, in which the porous film 180 is separated, is increased, resistance against the pulsing air is reduced, and thereby the filter cleaning may be performed with a little power.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

DESCRIPTION OF REFERENCE NUMERALS

100: dust collector, 110: inlet chamber
111: inlet pipe, 120: discharge chamber
121: discharge pipe, 130: barrier
140: filter cleaning device
142: compressed air storage tank
144: diaphragm valve
146: blow tube
160, 170: bag filter, 161, 171: opening part
163, 173: filter medium
174: auxiliary ring
180: porous film, 185: porosity control material
190: chamber, 200: dust source
300: blower, 1000: dust collection system

What is claimed is:

1. A bag filter comprising a tubular filter medium whose one end is closed and the other end has an opening part through which a gas flows,
    wherein the tubular filter medium is laminated by a plurality of additional tubular filter mediums having different lengths from each other and having open both ends, and the number of the additional tubular filter medium is decreased in a stepwise manner from the opening part toward the closed end of the bag filter.

2. The bag filter according to claim 1, wherein the tubular filter medium has a circular or a polygonal cross section.

3. The bag filter according to claim 1, wherein the length of the bag filter is longer than 3m.

* * * * *